(12) United States Patent
Corcoran et al.

(10) Patent No.: US 6,360,300 B1
(45) Date of Patent: Mar. 19, 2002

(54) SYSTEM AND METHOD FOR STORING COMPRESSED AND UNCOMPRESSED DATA ON A HARD DISK DRIVE

(75) Inventors: Brian Jeffrey Corcoran, Oro Valley, AZ (US); Shanker Singh, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/387,203

(22) Filed: Aug. 31, 1999

(51) Int. Cl.$^7$ ................................................ G06F 12/12
(52) U.S. Cl. ........................ 711/139; 711/160; 711/113; 711/173
(58) Field of Search ................................. 711/133, 134, 711/136, 154, 159, 160, 161, 165, 1, 100, 111, 112, 114, 170, 171, 173, 113; 710/68; 707/101; 360/8

(56) References Cited

U.S. PATENT DOCUMENTS

| | | |
|---|---|---|
| 4,607,346 A | 8/1986 | Hill .............................. 711/170 |
| 5,210,866 A | 5/1993 | Milligan et al. ................ 714/6 |
| 5,237,460 A | 8/1993 | Miller et al. .................... 360/8 |
| 5,237,675 A | 8/1993 | Hannon, Jr. ................... 710/68 |
| 5,247,638 A | 9/1993 | O'Brien et al. ................ 710/68 |
| 5,247,660 A | 9/1993 | Ashcraft et al. ............. 707/205 |
| 5,406,278 A | 4/1995 | Graybill et al. ................ 341/51 |
| 5,438,671 A | 8/1995 | Miles .......................... 709/247 |
| 5,490,260 A | 2/1996 | Miller et al. ................. 711/100 |
| 5,537,588 A | 7/1996 | Engelmann et al. ......... 707/202 |
| 5,617,552 A * | 4/1997 | Garber et al. ................... 711/1 |
| 5,627,995 A * | 5/1997 | Miller et al. ................. 711/171 |
| 5,640,158 A | 6/1997 | Okayama et al. ............. 341/51 |
| 5,649,151 A | 7/1997 | Chu et al. .................... 711/111 |
| 5,659,755 A | 8/1997 | Strohacker ................... 708/203 |
| 5,721,858 A | 2/1998 | White et al. ................. 711/203 |
| 5,734,892 A * | 3/1998 | Chu ............................ 707/101 |
| 5,758,050 A | 5/1998 | Brady et al. .................... 714/1 |
| 5,778,255 A | 7/1998 | Clark et al. .................... 710/68 |
| 5,805,086 A | 9/1998 | Brown et al. .................. 341/51 |
| 5,838,964 A | 11/1998 | Gubser ........................ 707/101 |

OTHER PUBLICATIONS

"Automatic Data Compression Control for Hibernation," IBM Technical Disclosure Bulletin, vol. 39, No. 04, Apr. 1996.
"Extendable Random Access Memory File System," IBM Technical Disclosure Bulletin, vol. 38, No. 05, May 1995.
"High–Speed Data Transfer Utility," IBM Technical Disclosure Bulletin, vol. 33, No. 12, May 1991.

\* cited by examiner

*Primary Examiner*—Matthew Kim
*Assistant Examiner*—Brian R. Peugh
(74) *Attorney, Agent, or Firm*—Sawyer Law Group LLP; Noreen A. Krall

(57) ABSTRACT

A system and method for organizing compressed data and uncompressed data in a storage system. The method and system include a compressor for compressing a data block into a compressed data block, wherein N represents a compression ratio. The storage disk includes a first disk partition having N slots for storing compressed data, and a second disk partition for storing uncompressed data. A portion of the N slots in the first partition include address pointers for pointing to locations in the second disk partition containing the uncompressed data.

21 Claims, 3 Drawing Sheets

SYSTEM AND METHOD FOR STORING COMPRESSED AND UNCOMPRESSED DATA ON A HARD DISK DRIVE

CROSS-REFERENCE TO RELATED APPLICATION

The present invention is related to co-pending U.S. patent application Ser. No. 09/386,599, entitled "A Method And System For Efficiently Storing Compressed Data On A Hard Disk Drive;" which is assigned to the Assignee of the present application and filed on the same date as the present application

FIELD OF THE INVENTION

The present invention relates to storing data on a hard disk drive, and more particularly to system and method for organizing compressed and uncompressed data on a hard disk drive to increase storage capacity, while reducing complexity.

BACKGROUND OF THE INVENTION

Typically, hard disk drives (HDD) are formatted physically and logically. Physically, a disk is divided into many equal-sized regions, such as sectors (pie slices) and tracks (concentric circles), so that data can be recorded in a logical manner and accessed quickly by read/write heads that move back and for the over the disk as it spins. Logically, a disk is formatted according to the standards of a host operating system. In a personal computer (PC) for example, the operating system treats the HDD as a sequential list of 512-byte block addresses.

To increase the storage capacity of HDD's, data may be compressed before storage. Basic data compression can be inefficient, however, when the data compresses to a size smaller than the standard block size of the system because the unused portion of a block become unavailable for future storage and will go unused. Assume for example that a 512-byte data block compresses at a ratio of 2:1, yielding 256-bytes. Storing the 256-byte data block into a 512k-byte logical block on a hard drive results 256-byte of wasted storage space.

A more complex and advanced compression scheme based on log structure array (LSA) is a concept often used in large, high-performance storage systems. LSA is capable of providing data management in direct access storage systems (DASD) where HDD's are organized as a redundant array of inexpensive disks (RAID). In such DASD systems, LSA is also used to manage compressed data using a log-structured file system (LSF). LSF attempts to provide improved disk performance by maintaining large free areas on the HDD in order to speed up writes to the disks. To manage the HDD's in such a manner, each HDD in the RAID is interfaced with a hard disk assembly (HDA) circuit board, which includes a HDD controller, a buffer memory, and the LSF compression support circuit.

In operation, the LSF compression support circuit allows for the use of storage space left over when compressed data is stored in a logical block. For example, assume that a 512-byte data block compresses at a ratio of 4:1, yielding 128-bytes, then the data would be stored in the first 128-bytes of a 512-byte hard disk block, leaving 384-bytes free. If a second 512-byte data block compresses at a ratio of 2:1, then the resulting 256-bytes is stored in the same data block, which now has 128-bytes free. If a third data block is to be stored that is larger than 128-bytes, then the first 128-bytes of the data would be stored in the remainder of the disk block, and the rest would be stored in an overflow location. Alternatively, LSF may attempt to free more space with the storage block by moving previously stored data to a different block or by deleting old, unused data during a complex background process.

A LSA algorithm can also handle compression for two or more disk or a RAID. Through hardware or software functionality, multiple physical disks are treated as one logical disk to prevent data loss in case of a single HDD crash. The parity bit for each data block, which is used for error recovery, is either stored on a separate drive or spread across many drives for different data blocks. LSA is used to manage both the compression of the data and the byte-parity error-recovery process, adding to its complexity.

Although the capacity of buffer memories and HDD's continues to increase, so does the requirement for storage as evidenced by the rise of digital imaging applications. Therefore, the need for efficient data compression to provide increased storage capacity will continue. However, today's storage intensive devices, such as digital cameras for example, continue to decrease in size and cannot accommodate traditional HDA circuit boards. It has been anticipated that this problem will be overcome by replacing traditional HDA circuit boards with a single chip that includes the HDD controller, a large capacity buffer memory, and a data compression/decompression engine. However, a scheme such as LSA is too complex to provide the necessary support for LSA on such a small scale.

Accordingly, what is needed is a simplified system and method for efficiently storing compressed data on a hard disk drive that can be implemented on a single chip HDD controller. The present invention addresses such a need.

SUMMARY OF THE INVENTION

The present invention provides a system and method for organizing compressed data and uncompressed data in a storage system. The method and system include a compressor for compressing a data block into a compressed data block, wherein N represents a compression ratio. The storage disk includes a first disk partition having N slots for storing compressed data, and a second disk partition for storing uncompressed data. A portion of the N slots in the first partition include address pointers for pointing to locations in the second disk partition containing the uncompressed data.

In another aspect of the present invention, the method and system further include a memory buffer for caching data, wherein the buffer includes a first buffer partition for storing the uncompressed data, and a second buffer partition for storing the compressed data. This increases the total byte storage capacity of the buffer and can also increase system performance as more bytes can be transferred to and from the buffer. Once the first buffer partition reaches a first predetermined storage level, space is freed in the first buffer partition by moving a portion of the uncompressed data to the second disk partition Once the second buffer partition reaches a second predetermined storage level, space is freed in the second buffer partition by moving a portion of the compressed data to the first disk partition.

Accordingly, the present invention provides improved storage efficiency over prior methods at the cost of adding a minimal complexity, which will be acceptable in future HDD's and can easily be integrated in a single chip HDD controller, due to anticipated 20 advancements in support electronics in VLSI.

DETAILED DESCRIPTION

The present invention relates to a system and method for organizing compressed and uncompressed data on a hard disk drive to increase storage capacity. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
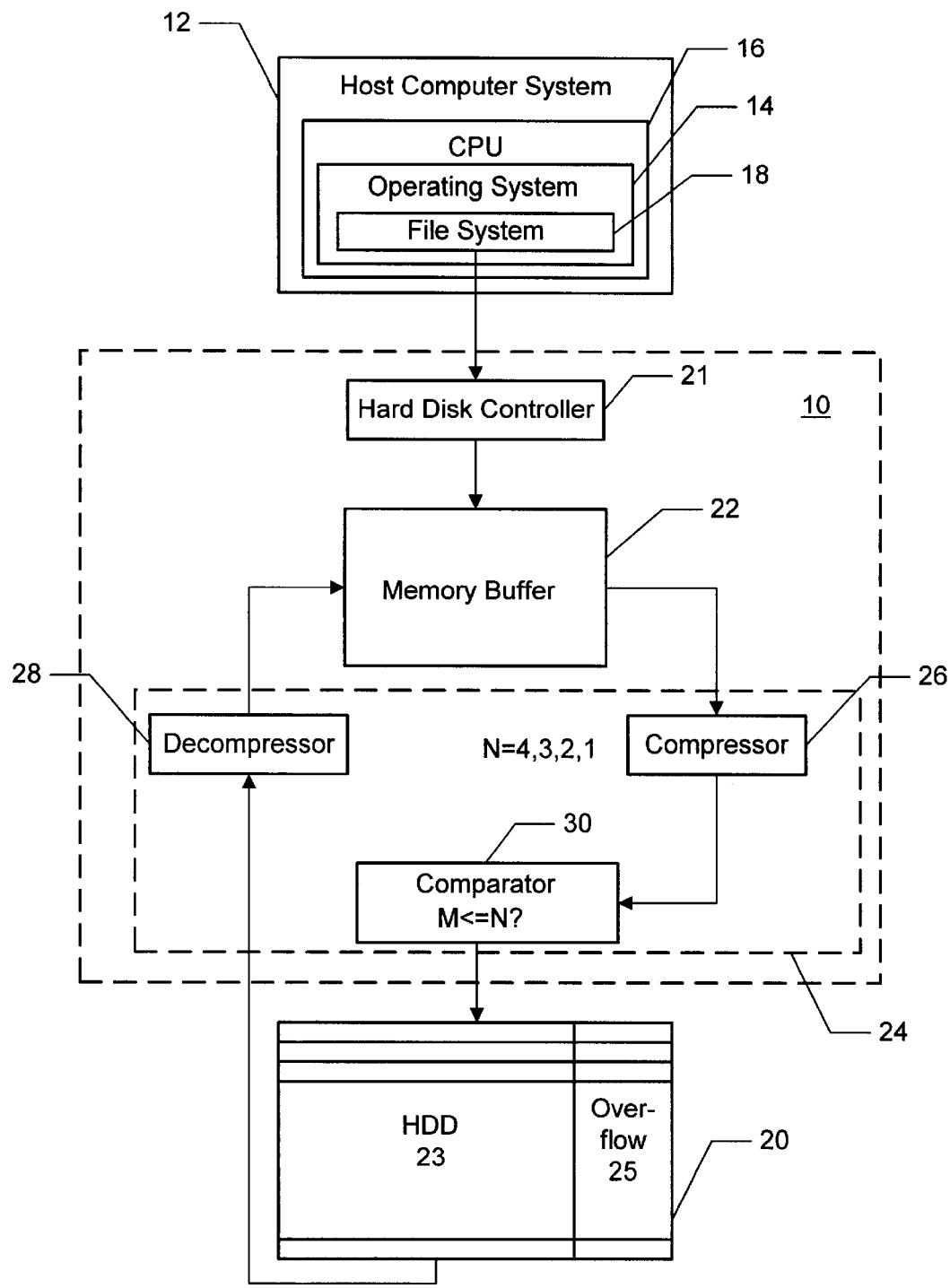
FIG. 1 is a block diagram illustrating a storage system for use with the present

FIG. 1 is a block diagram illustrating a HDA storage system 10 for use with the present invention. The storage system 10 is used by or in conjunction with host computer system 12 running an operating system 14 on a CPU 16. Requests for data transfers between the operating system 14 and the storage system 10 are typically handled by a file system 18.

The storage system 10 includes a hard disk drive (HDD) 20, a disk controller 21, a buffer memory 22, and a compression/decompression engine 24. The HDD 20 is the storage medium for the host computer system 12, and is formatted in accordance with the file system 18 of the operating system 14. For DOS compatible file systems 18, the HDD is formatted in 512-byte fixed-sized storage blocks.

The disk controller 21 is a circuit that communicates with the file system 18 and controls transmission of data to and from the HDD 20. The compression/decompression engine 24 is coupled to the disk controller 21, the HDD 20 and the buffer memory 22 for compressing data that needs to be saved, and decompressing compressed data that needs be retrieved.

In a preferred embodiment, the compression/decompression engine 24 includes a separate compressor 26 and decompressor 28 for performing compression and decompression, respectively, although other implementations are also suitable. The compression/decompression engine 24 also includes a compression ratio comparator 30 (also known as a compression sniffer), which functions as explained below.

The buffer memory 22 is a section of memory that caches data between the HDD 20 and the CPU. The buffer memory 22 may also be referred to as a disk cache. In operation, an application (not shown) executing on the host computer system 12 makes request to write and read data to and from the HDD 20. When the disk controller 21 receives a requests to write data to the HDD 20, the disk controller 21 queues up data blocks in the buffer memory 22 at high speed, and then writes them to HDD 20 during idle CPU cycles via the compressor 26. When the disk controller 21 receives a request to read data from the HDD 20, the disk controller 21 reads a larger number of data blocks from the HDD 20 than what was requested and copies them into the cache 22 via the decompressor 28. If subsequent requests for data can be satisfied with data blocks from in the memory buffer 22, a much slower HDD 20 access is not required. Since the memory buffer 22 is relatively large (8–32 MB), over time most of the data needed by an executing application will be transferred to and from the memory buffer 22.

In one preferred embodiment of the present invention, the HDD 20 is divided into two partitions for storing compressed and uncompressed data. To more particularly describe the features of the present invention refer now to FIG. 2.

Figure 2:
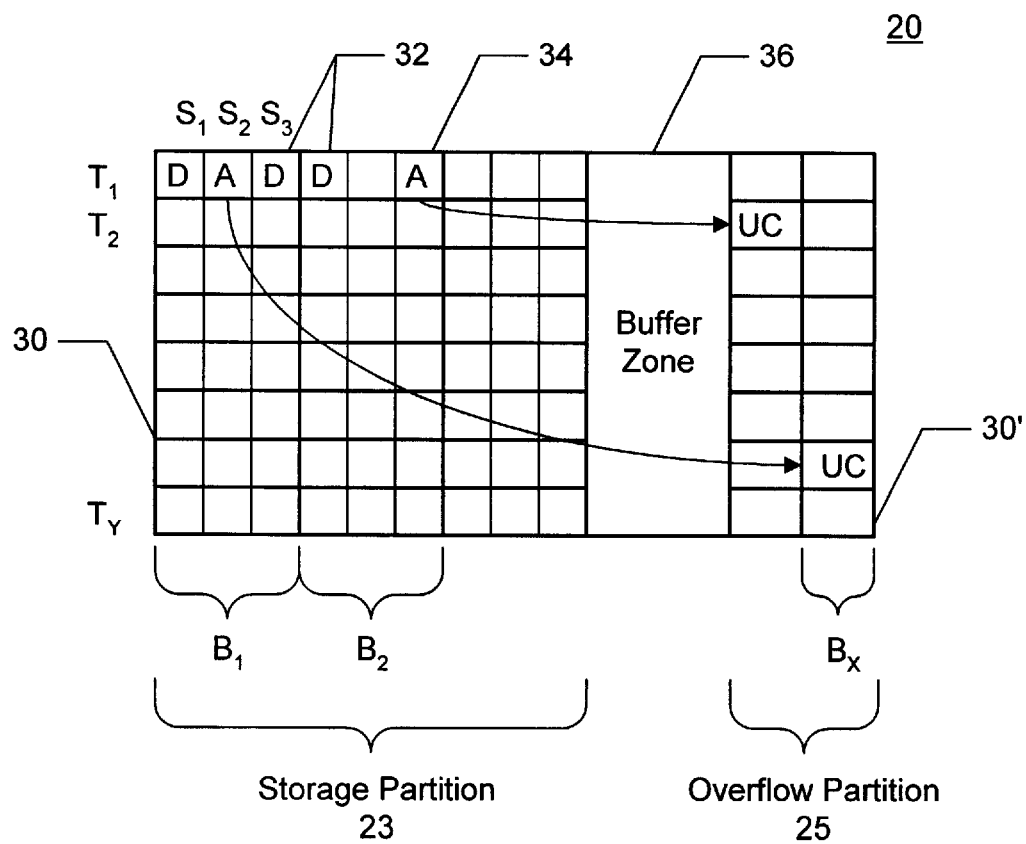
FIG. 2 is a block diagram illustrating the organization of a HDD in accordance with the present invention.

FIG. 2 is a block diagram illustrating the organization of a HDD 20 in accordance with the present invention. The HDD 20 includes one or more tracks ($T_1, T_2, \ldots, T_y$), each containing fixed-size storage blocks 30 ($B_1, B_2, \ldots, B_x$). The HDD 20 is partitioned into a storage partition 23, and an overflow partition 25. As data is being compressed, the compressor/decompressor engine 24 keeps track of compression ratios of data blocks during compression and compiles an average compression ratio N.

According to the present invention, the average compression ratio N is utilized to partition the blocks 30 in the storage partition 23 into N slots ($S_1, S_2, \ldots, S_N$) 32, where N=1 implies a normal uncompressed data block size. Each slot 32, therefore, will be 1/N the size of a HDD block 30.

Since the size of the slots is based on the average compression ratio N, a majority of the compressed data blocks will fit into one slot 32. Any data blocks that fail to compress at least average will be partially stored in the overflow partition 25. That is, in the rare instances where the size of a compressed data block is larger than 1/N, the uncompressed data block is stored in an overflow block 30'. An address pointer 34 is stored within a storage partition slot 32 to point to the location of the overflow block 30'.

To determine whether compressed data will fit into one storage partition slot 32 or will need to be stored in the overflow partition 25, the compression ratio comparator 30 determine a compression ratio (M) of a current compressed data block and compares it with the average compression ratio (N). If M is less than or equal to N, then the data block compressed at or more than average, and the compressed data is stored in a storage partition slot 32. If M is greater than N, then the data block compressed less than average and the data will be stored uncompressed in one of the overflow partition blocks 30'.

Assuming that N=3, for example, then each storage partition block 30 will be partitioned into three slots 32 and data blocks will normally compress to ⅓ their original size. Depending on the application, almost 90% of the ⅓ sized slots will accommodate compressed data and 10% of the storage partition slots 32 will contain the addresses 34 of overflow partition blocks 30'.

In a preferred embodiment of the present invention, the overflow partition 25 may comprise approximately ten percent of the HDD 20. The host file system 18 is unaware of overflow partition 25, which is controlled by the disk controller 21. The file system 18 only sends requests to the disk controller 21 to transfer data to and from the storage partition 23. In response to an overflow situation from the comparator 30, the disk controller 21 finds empty blocks 30' in the overflow partition 25 and provides the address of those blocks 30'. It appears to the file system 18 therefore, that all data blocks are compressed.

As will be appreciated by those with ordinary skill in the art, addresses will dynamically change as data is modified. Some of the data blocks that were previously compressible may become incompressible and some that were previously incompressible may become compressible after the modification. Therefore, the present invention also provides an empty buffer zone 36 between the storage partition 23 and the overflow partition 25 that is to be used only either the storage partition 23 or the overflow partition 25 become full.

The disk controller 21 dynamically adjusts the boundary of the storage and overflow partitions 23 and 25 according to the storage need of the compressed and uncompressed data. This enables storage use to be maximized based on the compression characteristics of the data. When, for example, much of the data fails to compress adequately and the overflow partition 25 becomes full, the disk controller 21 requests additional space from the buffer zone 36 from the file system 18, which controls the storage partition 23. Additional space is then allocated to the overflow partition 23, effectively increasing the storage capacity of the HDD 20. Once one of the partitions 23 and 25 becomes full and no more space is available in the buffer zone 36 to reallocate, the HDD 20 is considered full.

In a second preferred embodiment of the present invention, similar to the HDD 20, the memory buffer 22 is also partitioned into two partitions for storing compressed and uncompressed data. To more particularly describe the features of the present invention refer now to FIG. 3.

Figure 3:
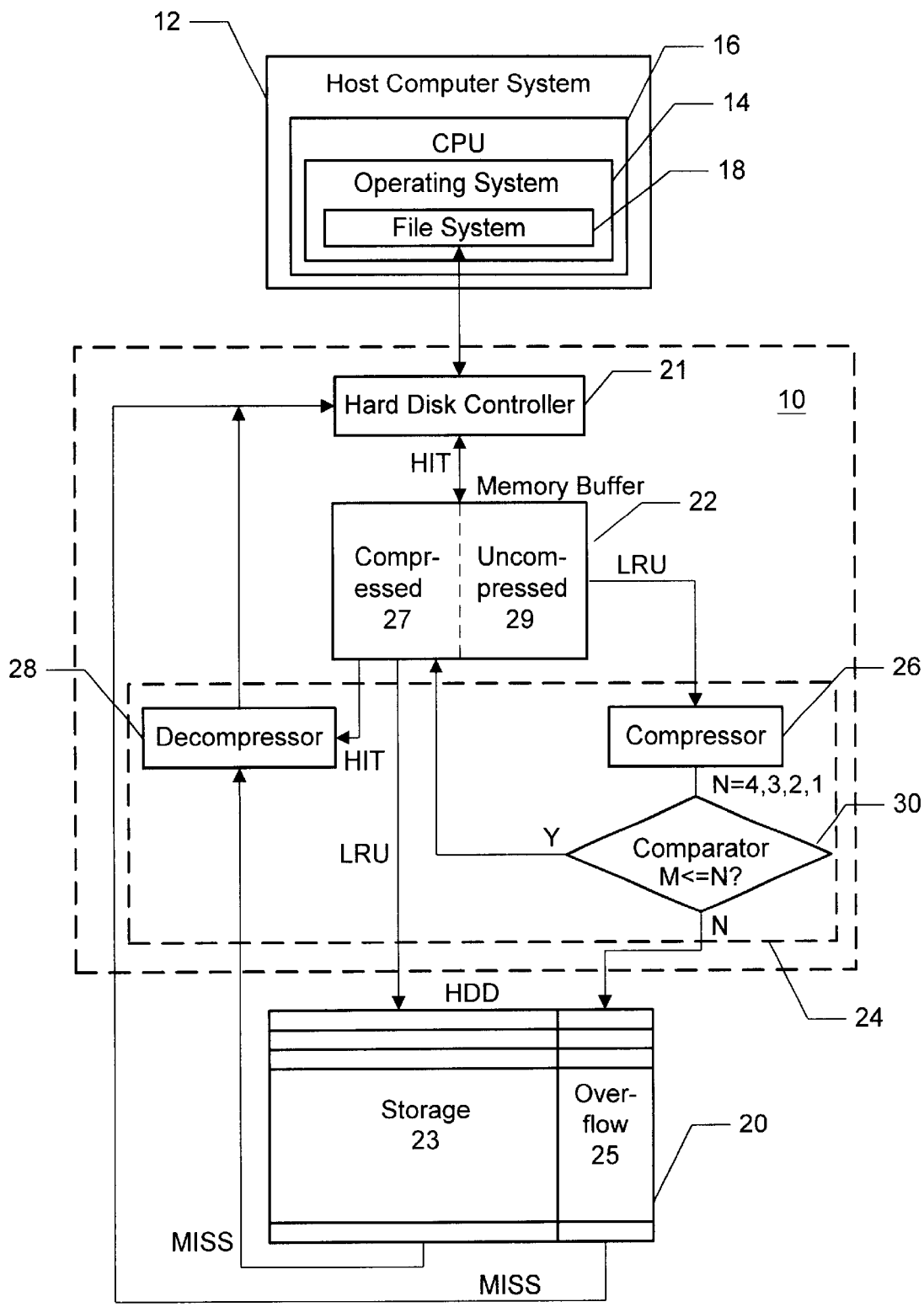
FIG. 3 is a block diagram illustrating the storage system in a second preferred embodiment wherein both a memory buffer and a HDD are partitioned.

FIG. 3 is a block diagram illustrating the storage system wherein both the memory buffer 22 and the HDD 20 are partitioned in accordance with the present invention. The memory buffer 22 is divided into a compressed partition 27 and an uncompressed partition 29. The uncompressed partition 29 is used to store data that is most frequently used (MFU) by the file system 18. Since this data is most frequently cached in and out of the memory buffer 22, it is stored in uncompressed form to speed data access. The compressed partition 27 is used to store data that less frequently used by the file system 18. Since this data is not requested as often as the data in the uncompressed partition 27, it is compressed before storage to increase the storage capacity of the memory buffer 22.

In operation, when the system is first powered and the uncompressed partition 29 is empty, all data blocks are initially stored uncompressed in the uncompressed partition 29. Once the uncompressed partition 29 is filled or reaches a predetermined storage level, the least recently used (LRU) data blocks are sent to the compressor 26 for compression and storage in the compressed partition 27. As the data is being compressed, the comparator 30 keeps track of compression ratios of the data blocks and compiles and average compression ratio N. Alternatively, the comparator 30 may estimate the average compression ratio N as data is written into the uncompressed partition 29 of the memory buffer 22 during application execution.

The data blocks that compress to equal or less than the average compression ratio N are stored in the compressed partition 27. Once the compressed partition 27 becomes full (or reaches a predetermined storage level) or when a data block fails to compress at least average, the data is stored in the HDD 20.

Referring to both FIGS. 2 and 3, once the compressed partition 27 of the memory buffer 27 becomes full or reaches a predetermined level, the least recently used (LRU) data block or blocks are moved to slots 32 in the storage partition 23 of the HDD 20. Since all the data blocks in the compressed partition 27 compressed less than or equal to the average compression ratio N, each of the data blocks will fit into one slot 32.

When the compressor 26 is unable to compress a LRU data block from the uncompressed partition 29 of the memory buffer 22 to the average compression ratio N, the data is stored as uncompressed data (UD) in the overflow partition 25 of the HDD, as described above.

When the file system 18 request data from the storage system 10, the requested data may reside in one of the partitions 27 and 29 of the memory buffer 22, which is termed a "HIT". If the data resides in the uncompressed partition 29 of the memory buffer 22, the data is simply fetched and returned. If the data resides in the compressed partition 27 of the memory buffer 22, the data is first decompressed by decompressor 28 before being returned.

In case of a "MISS", the data must reside either in the storage partition 23 or the overflow partition 25 of the HDD 20. If the data is in the storage partition 23, then it is compressed and must be decompressed by decompressor 28 before being returned. If the data is in the overflow partition 25, then it is simply returned.

A simple and yet storage efficient system and method for storing compressed data on a HDD 20 has been disclosed. Due to advancements in VLSI chip technology, all hardware support needed to manage the compressed data can be integrated in a single chip HDD controller that includes the memory buffer and host logic interface.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for organizing compressed data and uncompressed data in a storage system, comprising;
   a buffer for caching data, the buffer including,
      a first buffer partition for storing the uncompressed data, and
      a second buffer partition for storing the compressed data; and
   a storage disk coupled to the buffer, the storage disk including
      a first disk partition, and
      a second disk partition,
   wherein once the first buffer partition reaches a first predetermined storage level space is freed in the first buffer partition by moving a portion of the uncompressed data to the second disk partition, and once the second buffer partition reaches a second storage level space is freed in the second buffer partition by moving a portion of the compressed data to the first disk partition.

2. The system of claim 1 further include a compressor coupled between the buffer and the storage disk, wherein when the first buffer partition reaches the first predetermined storage level, the compressor compresses a least recently used data block in the first buffer partition into a compressed data block, wherein N represents an average compression ratio.

3. The system of claim 2 wherein if the compressed data block is less than or equal to 1/N of a data block size of an operating system, then the compressed data block is stored in the second buffer partition.

4. The system of claim 3 wherein if the compressed data block is greater than 1/N of the data block size, then the least recently used block is stored uncompressed in the second disk partition.

5. The system of claim 4 wherein once the second buffer partition reaches the second predetermined storage level, a least recently used compressed data block is moved to the first disk partition.

6. The system of claim 5 wherein the first disk partition includes a first block, wherein the first block is partitioned into N slots.

7. The system of claim 6 wherein the second disk partition is an overflow partition.

8. The system of claim 7 further including a disk controller for controlling the buffer and storage disk.

9. The system of claim 8 further including a host system, wherein the first buffer functions to cache data between the disk and the host system.

10. The system of claim 9 further including a decompressor coupled to the disk controller, the disk, and to the first buffer, and decompresses data that is to be read from the first buffer partition and the second disk partition.

11. A system for storing data comprising;
  a memory buffer for caching data, the memory buffer including,
    a first buffer partition for storing most frequently used data blocks in uncompressed form to speed data access, and
    a second buffer partition for storing less frequently used data blocks in compressed form to increase storage capacity;
  a compressor coupled to the memory buffer for compressing a least recently used (LRU) data block from the first buffer partition into a LRU compressed data block when the first buffer partition reaches a first predetermined storage level, wherein N represents a compression ratio;
  a storage disk coupled to the compressor, the storage disk including
    a storage partition for storing compressed data blocks, and
    an overflow partition for storing uncompressed data blocks; and
  a comparator coupled to the compressor and the storage disk for determining if the compressed LRU data block compressed to a size less than or equal to 1/N, such that if the compressed LRU data block did compress to a size less than or equal to 1/N, then the compressed LRU data block is stored in the second buffer partition, and if the compressed LRU data block compressed to a size greater than 1/N, then the LRU data block is stored in the overflow partition of the storage disk, thereby freeing space in the memory buffer.

12. The system of claim 11 wherein once the second buffer partition reaches a second predetermined storage level, a compressed LRU data block is moved from the second buffer partition to the storage partition of the storage disk to further free space in the memory buffer.

13. The system of claim 12 wherein the storage partition includes a plurality of blocks and at least a portion of the blocks are partitioned into N slots.

14. The system of claim 13 wherein the slots have a size of 1/N of the block size, such that the compressed LRU data block can be stored in one slot.

15. The system of claim 14 further including a disk controller for controlling the storage disk.

16. The system of claim 15 further including a host system, wherein the memory buffer functions to cache data between the storage disk and the host system.

17. The system of claim 16 further including a decompressor coupled to the memory buffer, the disk controller, and the storage disk for decompressing compressed data blocks that need to be read from the second buffer partition and the storage partition.

18. A method for organizing data in a storage system, comprising the steps of:
  (a) partitioning a buffer memory into a first partition and a second partition;
  (b) partitioning the hard disk comprising a plurality of blocks into a storage partition and an overflow partition;
  (c) storing uncompressed data that is most frequently used in the first partition of the buffer memory;
  (d) once the first partition of the buffer memory becomes full, compressing a least recently used (LRU) data block from the first buffer partition to create a compressed LRU data block;
  (e) determining an average compression ratio N;
  (f) determining a compression ratio M of the compressed LRU data block;
  (g) when $M \leq N$, storing the compressed LRU data block in the second partition of the buffer memory; and
  (h) when M>N, storing the LRU data block in the overflow partition of the hard disk.

19. The method of claim 18 wherein step (g) further includes the step of:
  i) when the second partition of the buffer memory becomes full moving a compressed LRU data block from the second partition of the buffer memory to thestorage partition of the hard disk.

20. The method of claim 19 wherein step (b) further includes the step of:
  separating at least a portion of the blocks in the storage partition into N slots having a size 1/N of the block size.

21. The system of claim 20 wherein step (b) further includes the step of:
  providing a buffer zone between the storage partition and the overflow partition for storage when either the storage partition or the overflow partition become full.

* * * * *